Feb. 13, 1968  S. F. RAK  3,368,683
POOL WATER TREATMENT SYSTEM
Filed April 30, 1965  3 Sheets-Sheet 1
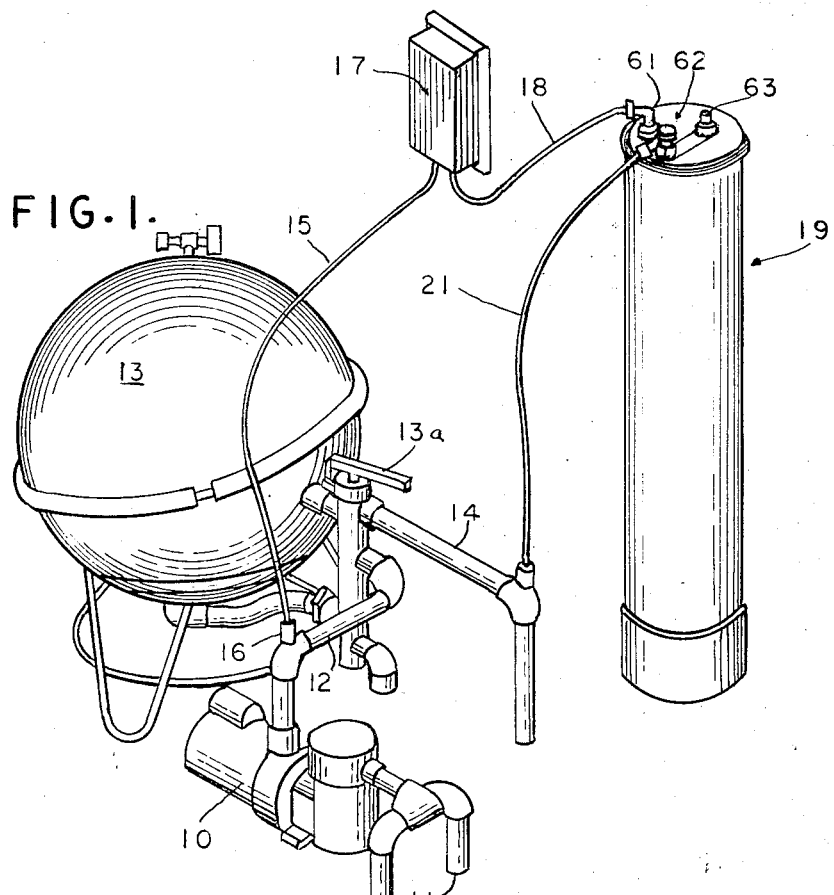
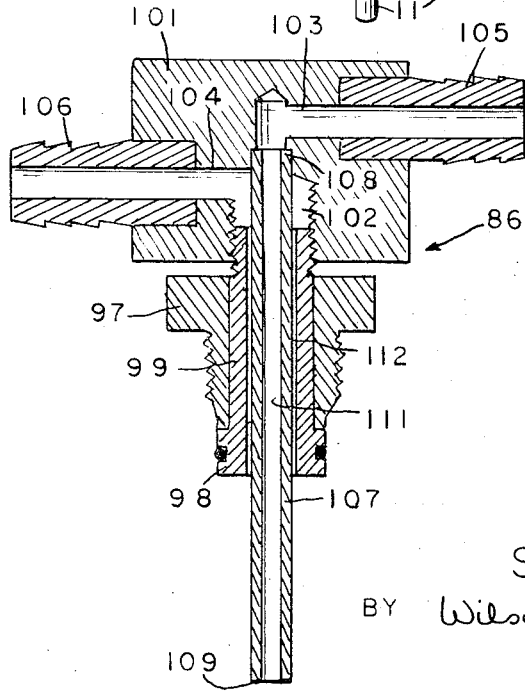
INVENTOR
STANLEY F. RAK
BY Wilson & Geppers
ATTORNEYS Feb. 13, 1968 — S. F. RAK — 3,368,683
POOL WATER TREATMENT SYSTEM
Filed April 30, 1965 — 3 Sheets-Sheet 2

INVENTOR
STANLEY F. RAK
BY Wilson & Geppert
ATTORNEYS

Feb. 13, 1968

S. F. RAK 3,368,683

POOL WATER TREATMENT SYSTEM

Filed April 30, 1965

INVENTOR
STANLEY F. RAK

BY Wilson & Geppert

ATTORNEYS

United States Patent Office 3,368,683
Patented Feb. 13, 1968

3,368,683
POOL WATER TREATMENT SYSTEM
Stanley F. Rak, Mundelein, Ill., assignor to Culligan, Inc., Northbrook, Ill., a corporation of Delaware
Filed Apr. 30, 1965, Ser. No. 452,165
6 Claims. (Cl. 210—138)

ABSTRACT OF THE DISCLOSURE

A pool water treatment system having a pump drawing water from the pool and circulating it through a filter from whence it is returned to the pool. The system includes a treating solution storage tank having a flexible liner therein containing treating solution. A time controlled solenoid valve periodically passes pressure fluid from the discharge side of the pump to the storage tank to compress the flexible liner and force the treating solution through an anti-siphon valve on the tank to the water stream being returned to the pool from the filter. The anti-siphon valve prevents removal of the treating solution from the storage tank by suction.

---

The present invention relates to a swimming pool water treatment system and more particularly to a system for intermittently feeding a sterilization or disinfection agent or other chemical solution into a stream of the circulating liquid with the pressure of the liquid stream automatically sustaining the feeding of the chemical agent.

Chlorine, sodium hypochlorite and calcium hypochlorite are widely utilized to prevent bacterial growth in swimming pools and in sterilizing solutions in general and a high chlorine level is a good algacide. However, although relatively stable in the dark, the aqueous solutions of these chemicals have the tendency to decompose upon sustained exposure to sunlight such as would be prevalent for most swimming pool locations. It is, therefore, necessary to feed certain amounts of one of these chemicals to the swimming pool water to replenish the chemical decomposed by the sunlight or by contaminants in the pool.

It has been discovered that some species of algae can proliferate in pool water containing low, but bactericidally, effective concentrations of chlorine. Further, pools treated on an intermittent basis such that two to four parts per million chlorine is added whenever the residual drops to approximately 0.3 parts per million do not allow algae to proliferate as readily. In addition, the relatively high chlorine concentrations, especially the still higher local concentrations caused by the rapid rate of chlorine additions, frequently exceed the break point chlorine concentration and thereby disintegrate undesirable ammonium compounds.

Numerous types of chemical feeding pumps and siphoning systems have been tried for the feeding of chlorine containing materials or other corrosive liquids for treatment of swimming pool water as well as for the treatment of other liquids or material used in the regeneration of ion exchange resin, etc. However, problems of efficiency or economy have shown these systems to be impractical for the home owner having a small swimming pool on his property.

The present invention utilizes a positive action feed of a disinfectant solution, such as sodium hypochlorite, from a storage container or tank at a fixed rate to the quantity of water circulating through a recirculating pump and water filter system over a predetermined time interval. The system includes a recirculating pump, a water filter, a storage tank containing the disinfectant solution and a timer-flow valve communicating with the high pressure side of the recirculating pump and also communicating with the storage tank to displace the disinfectant solution with pool water flowing through the timer controlled flow valve.

The present invention further utilizes a steel storage tank for the chlorine solution and benefits from the inherent property of the steel tank to preclude sunlight which causes sodium hypochlorite solution to decompose at a much higher rate. As an example, where 15% sodium hypochlorite solution is stored in the steel storage tank under exposure to the sun, the concentration of the solution drops to about 12% in one month, whereas the same sodium hypochlorite solution stored in a white plastic or glass container will drop in concentration to less than 5% in the same time interval. Therefore, the storage tank and other parts of the pool water treatment system do not require special storage or housing but can be positioned near the pool in a location which will be exposed to sunlight.

An important object of the present invention is the provision of a swimming pool water treatment system utilizing the feeding of a chemical treating solution at a fixed rate from a storage tank to the circulating pool water flowing through a recirculation pump and pool water filter. The feeding is accomplished by the use of a timer control valve which includes a timer, a solenoid valve operated by the timer and a flow control within the valve to provide a substantially constant flow rate of the liquid through the valve during the actuation thereof.

Another important object of the present invention is the provision of a positive action feeding of the chemical treating solution from the storage tank. The storage tank includes a tank shell, a flexible plastic liner within the tank impervious to and containing the treating solution, an inlet from the timer-flow valve to the space between the liner wall and the tank wall and an outlet communicating with the interior of the liner. As liquid enters the space between the tank and liner, a substantially equal amount of treating solution is forced from the tank to be injected into the circulating water emerging from the pool filter.

A further object of the present invention is the provision of an anti-siphon valve located at the outlet of the storage tank through which the treating solution must pass to be injected into the pool water. This valve acts to prevent siphoning of the contents from within the liner and to reduce the possibility of reverse flow of swimming pool water to the bag. Such a valve is important in the system to prevent excessive amounts of treating solution from being injected into the pool water. This valve is so designed that a very low pressure of 1 pound per square inch (p.s.i.) is required to open the valve for fluid flow in the normal direction.

The present invention also comprehends the provision of a timer-flow valve arrangement to provide the proper quantity of water in the tank between the tank wall and liner resulting in a positive feed of treating solution to the water returning to the swimming pool. The timer is a calendar timer which actuates a solenoid flow valve for a predetermined period of time to permit flow of water to the tank. The solenoid valve also contains a flow control to provide a predetermined flow rate.

The present invention further comprehends the provision of a novel refill system for the tanks storing the treating solution. A plurality of tanks are refilled simultaneously and are connected in series with a refill valve connected to each of the tanks. A reservoir containing a substantial amount of the chemical treating solution refills the liners in the tanks while the water between the tank wall and the liner is displaced to waste or a drain. Once the tanks are refilled, flow is reversed to provide a suitable air head in each tank by siphoning a small amount of treating solution from each tank.

A further object of the present invention is the provision of a bag refill device having an inlet depending a short distance into the tank and an annular outlet surrounding the inlet. The lower end of the depending inlet also determines the liquid level in the liner when the siphoning action has taken place to provide an air head in the tank for proper operation.

Further objects are to provide a construction of maximum simplicity, efficiency, economy and ease of assembly and operation, and such further objects, advantages and capabilities as will later more fully appear and are inherently possessed thereby.

In the drawings:

FIG. 1 is an isometric view illustrating the present pool water treatment system including a circulating pump, pool water filter, timer-flow valve and lined storage tank for the chemical treating solution.

FIG. 4 is an enlarged vertical cross-sectional view of the bag refill device utilized on each tank in the refill system.

Figure 2:
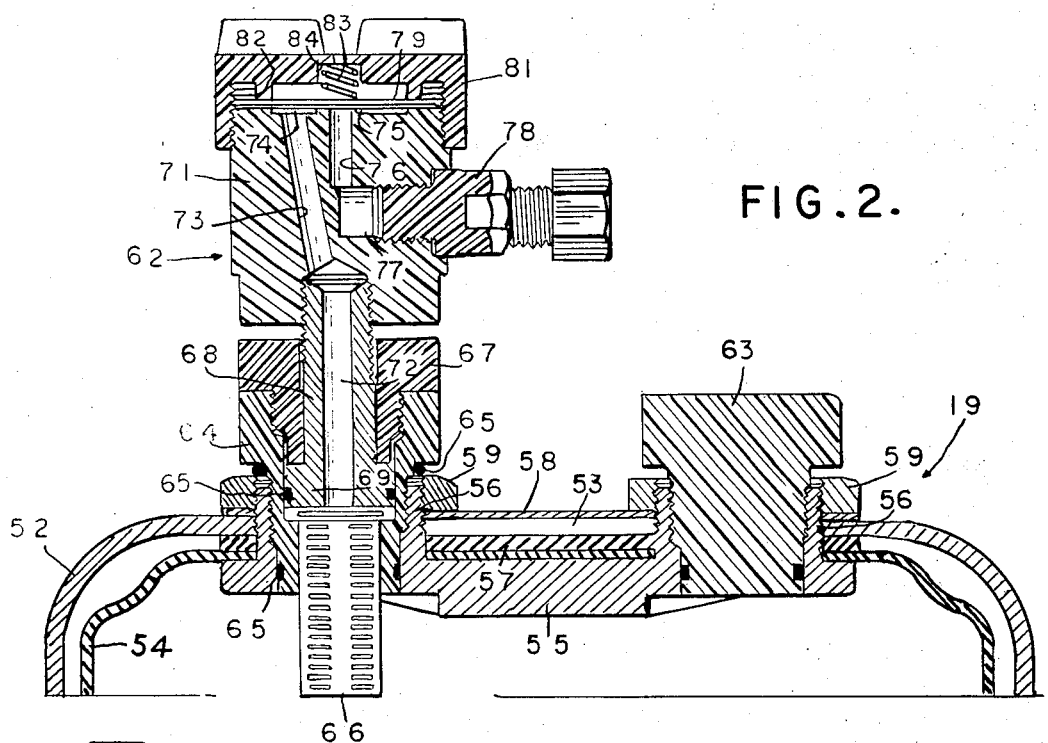
FIG. 2 is an enlarged partial vertical cross-sectional view of the top of the storage tank and showing the anti-siphon valve of the present invention.

Referring more particularly to the drawings in which is disclosed an illustrative embodiment of the present invention, FIG. 1 discloses the pool water treatment combination having a circulating pump 10 receiving water from a swimming pool (not shown) through one or more inlets 11, a pipe or conduit 12 from the pump 10 to a suitable filter 13 for the pool water through a diverter valve 13a, and an outlet pipe or conduit 14 leading from the valve 13a and returning the filtered water to the swimming pool. The inlet and outlet pipes are arranged as is well known in the art so that the entire capacity of the swimming pool is circulated through the filter in a given period of time.

The pump 10 may operate on a continuous basis or at intermittent periods during the day depending on the requirement of the particular swimming pool. If the pump is not operating continuously, it must have its own timer (not shown). A line or conduit 15 leads from the high pressure side of the pump 10, as at 16, to the timer-flow valve 17, and a second line or conduit 18 leads from the valve 17 to a storage tank 19 for a disinfectant solution. Water passing through the timer-flow valve 17 displaces the chemical solution in a manner to be later described, and the solution passes through a line or conduit 21 to the outlet pipe 14 to there combine and mix with the filtered water returning to the pool.

The pool water treatment system requires a continuous source of electricity for operation of the pump 10 and for operation of a calendar timer 22 of the timer-flow valve 17 with the feed time for the chemical solution being synchronized with the operation of the pump. If the pump also operates by means of a calendar timer, it is desirable that both timers be connected to the same electrical source so that any temporary power failures will affect both timers in the same manner and preserve synchronization.

As chlorine or chlorine containing compounds in aqueous solution are affected by sunlight tending to cause relatively rapid decomposition, it is desirable that the sodium hyochlorite or other chlorine containing compound be fed into the swimming pool water in the evening after the sun has set in order to provide prolonged contact of the high chlorine residual with contaminants such as algae, ammonium compounds and organic matter. Also, the recirculation pump should operate for at least one to two hours after the sodium hypochlorite is fed into the water to completely distribute the hypochlorite throughout the pool. If the pump operates continuously, there is no synchronization problem; however, if the pump is not required to operate continuously, then a separate timer must be provided so that the above requirement is met.

Figure 6:
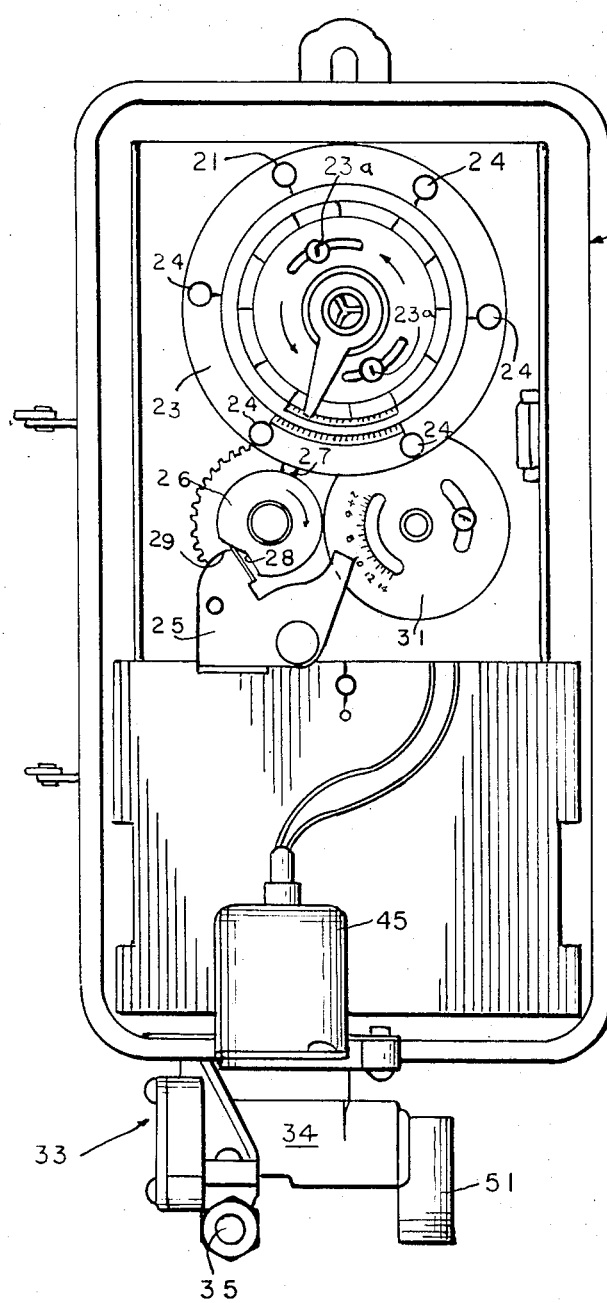
FIG. 6 is a front elevation of the calendar timer and flow control valve.

The pump 10 and the filter 13 are conventional in design and their structure will not be specifically described. The timer-flow valve 17 includes a calendar timer 22 (FIG. 6) which includes a timer dial 23 covering a six day interval as shown with feed pins 24 mounted on the dial to actuate a switch member 25 through a rotating cam 26 having a release member 27 contacted by the pin 24. The timer dial 23 consists of two dials held in place by the set screws 23a, and the relative adjusted positions of the two dials determine the time of day that feed will take place. The cam 26 has a depression 28 to receive an arm 29 of the switch member 25 in open position and, when the cam 26 rotates, the arm 29 and switch member 25 are moved to closed position actuating the flow valve.

A feed adjustment dial 31 for the chemical solution can be adjusted to change cam 26 and thus alter the time interval that the switch member 25 is closed. The timer is located in a case 32 with a solenoid actuated valve 33 of the timer-flow valve 17 mounted within the lower end of the casing and the solenoid connected to the switch member 25. As the calendar timer 22 is a six day timer, it provides for actuation of the solenoid valve 33 at a maximum of once a day and a minimum of once every six days. However, other timers could be utilized to actuate the valve as often as required by the pool installation or other requirement.

Figure 5:
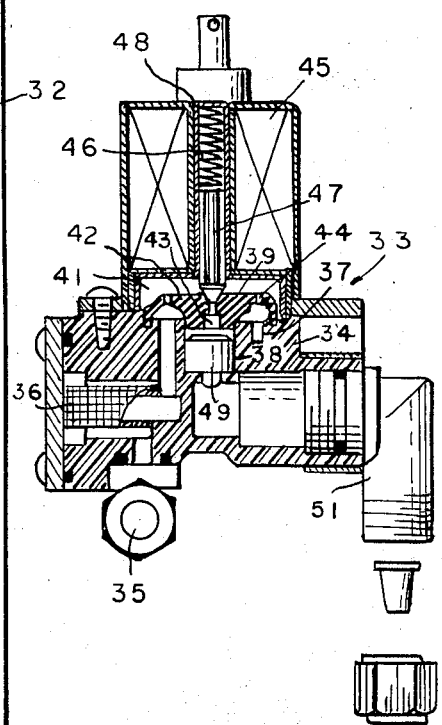
FIG. 5 is a vertical cross-sectional view of the flow control valve.

The solenoid valve 33 (FIG. 5) includes a casing 34 with an inlet 35 for water flow from the line 15 through a filter screen 36 and then to an annular chamber 37 surrounding a central passage 38. A diaphragm 39 is positioned in a diaphragm chamber 41 with the periphery of the diaphragm secured within the casing 34 and a central thickened area 42 pressed into the upper end of the passage 38. The central area 42 contains a central passage 43 communicating between the chamber 41 and the passage 38 and a plurality of openings 44 communicate between the chamber 41 and the annular chamber 37.

Extending upwardly from the casing is a solenoid 45 closing the upper end of the diaphragm chamber 42 and providing a central passage 46 for an armature 47. An expansion spring 48 normally biases the armature 47 downwardly so that the generally conical end thereof closes the central passage 43 in the diaphragm. The passage 38 includes a flow controller 49 formed of a resilient material and having a central orifice; the area of the orifice varying with any change in pressure exerted on the resilient body to provide a substantially constant flow rate over a range of pressure. The passage 38 then leads to an outlet 51 connected to the line 18.

The storage tank 19 for the chemical solution is constructed substantially as shown in the Lyall Patent No. 3,159,306, issued Dec. 1, 1964, entitled "Water Conditioning Tank and Liner." The tank includes a cylindrical tank wall 52 having a closed top and bottom except for an elongated slot 53 in the top thereof (FIG. 2). A flexible bag-type liner 54 formed of a suitable chemically-resistant plastic composition is completely sealed except for a pair of spaced openings in the top. A yoke 55 coated with a corrosion resistant plastic, such as a chlorinated polyether, is inserted into the liner through one of the openings and positioned with the spaced threaded projections 56 extending through the openings in the liner 54. The projections 56 define passages through the yoke to the interior of the liner. A resilient sealing gasket 57 is positioned over the projections 56 and engages the liner, and the projections are positioned to extend upward through the slot 53 in the tank.

A cover plate 58 has a pair of spaced openings receiving the projections 56 and abuts the top of the tank with the periphery of the plate 58 extending beyond the edge of the slot 53. A pair of internally threaded nuts 59 engage the external threads on the projections 56 to clamp and seal the liner 54 within the tank 52. As seen in FIG. 1, a third or inlet fitting 61 consisting of a threaded collar is secured to the top of the tank 52 with an opening in the tank communicating with the fitting 61 and with the space between the tank wall 52 and the liner 54. The line 18 from the valve 33 is connected to the fitting 61.

The liner 54 contains the hypochlorite or other chemical solution to be dispensed into the swimming pool water and the solution is fed through an anti-siphon valve 62 to the line 21 leading to the outlet conduit 14 from the filter 13. As seen in FIG. 2, a threaded plug 63 closes the passage in one of the two projections 56. A polyvinyl chloride adapter 64 is positioned in the other projection 56 and sealed therein through O-rings 65. An outlet strainer 66 is positioned in the adapter 64 and the anti-siphon valve 62 threadingly engages the adapter 64.

The valve 62 includes a flanged threaded fitting 67 threadingly engaging the adapter 64 and a tubular member 68 extends through the central passage of the fitting 67 with an enlarged base 69 clamped between the fitting and the adapter 64. The base 69 includes an annular groove for an O-ring 65 to seal the valve 62 in the adapter. The upper end of the tubular member 68 is threaded to engage the valve body 71 with the central passage 72 in the tubular member 68 aligned with an inclined or offset passage 73 in the valve body 71 which extends to the upper open end of valve body at an annular recess or depression 74 surrounding an annular valve seat 75. The valve seat defines the upper open end of a central passage 76 which terminates in a lateral passage 77 receiving a threaded fitting 78 for the line 21.

A diaphragm or flexible plate 79 covering both the annular recess 74 and the central passage 76 is clamped onto the valve body 71 by an internally threaded cap 81 having an annular clamping flange 82. A compression spring 83 has one end abutting the plate 79 directly above the passage 76 and the opposite end of the spring is received in a central recess 84 in the cap 81. The flexible plate or disk, if not formed of a plastic material, is coated with a suitable plastic to prevent corrosion upon exposure to the hypochlorite solution or other corrosive liquid employed. The area of the annular recess 74 exposed to the flexible plate 79 is substantially greater than the area of the central passage 76.

In operation, a pressure as low as 1 p.s.i. exerted through the slanted passage 73 will lift the plate 79 and allow flow from the recess 74 over the valve seat 75 into the central passage 76. However, any vacuum in passage 76 tending to siphon liquid from the tank will only draw the plate tightly against the valve seat 75. Also, reverse flow from the pool cannot occur at normal pool recirculation return line pressures as the spring 83 urges the plate downward, and the effective area of exposed plate 79 for the passage 76 is not sufficient to overcome the spring pressure.

In the treatment of swimming pool water to establish a sanitary condition, a chlorine containing compound, such as sodium hypochlorite, in aqueous solution is provided within the liner 54 of the storage tank 19. As the solution is corrosive in nature, the brass yoke 55 is coated with a suitable plastic compound, such as a chlorinated polyether, to impart chemical resistance, and the anti-siphon valve is generally formed of polyvinyl chloride. As sunlight causes relatively rapid decomposition of chlorine in the pool water, the calender timer 22 has the timer dial 23 adjusted to actuate the solenoid valve 33 through the feed pins 24 after sunset and the pump is set to operate for a minimum time interval of one to two hours upon actuation of the solenoid valve. The frequency of operation of the pump and the frequency of actuation of the solenoid valve will depend on the particular conditions of use of the swimming pool, its size, etc. Also, the feed adjustment dial 31 is adjusted for the time interval of solenoid actuation.

In operation, the pump 10 is drawing water from the swimming pool through inlet 11 and the water passes from the pump through conduit 12 and diverter valve 13ª to the inlet of the filter 13, and water emerges from the filter outlet through the valve 13ª to the outlet conduit 14 to return to the pool. Water also is under pressure in the conduit 15 from the conduit 12 to the valve casing 34. When the calendar timer 22 actuates the switch member 25 energizing the solenoid 45, the armature 47 is lifted away from the diaphragm 41 against the action of spring 48. The lifting of the armature 47 opens the central passage 43 in the diaphragm 41 to allow liquid flow from the diaphragm chamber 42 through the passage 43 into the central passage 38 in the valve body 34. Liquid under pressure passes from annular chamber 37 through the openings 44 into the diaphragm chamber 42 and then out through the central passage 43 to the passage 38 where the liquid passes through the flow controller 49 and conduit 18 to the fitting 61 on the tank 19.

The water enters the space between the tank 52 and the liner 54 and positively displaces an equivalent amount of hypochlorite solution through the anti-siphon valve 62 and conduit 21 to enter the recirculated stream of filtered swimming pool water in conduit 14. The valve 17 is actuated for a predetermined time interval so that a given quantity of water passes therethrough, and the solenoid is deenergized to allow the armature to close the central passage 43 in the diaphragm terminating liquid flow through the valve. The pump 10 continues to operate for approximately one to two hours to completely distribute the hypochlorite in the pool water. This system can be utilized for dispensing any type of fluid from the tank 19 with any type of pressurized liquid; however, if the solution within the liner is less dense than the fluid entering between the tank and liner, the pressurized inlet fitting 61 should be located at the bottom of the tank.

Figure 3:
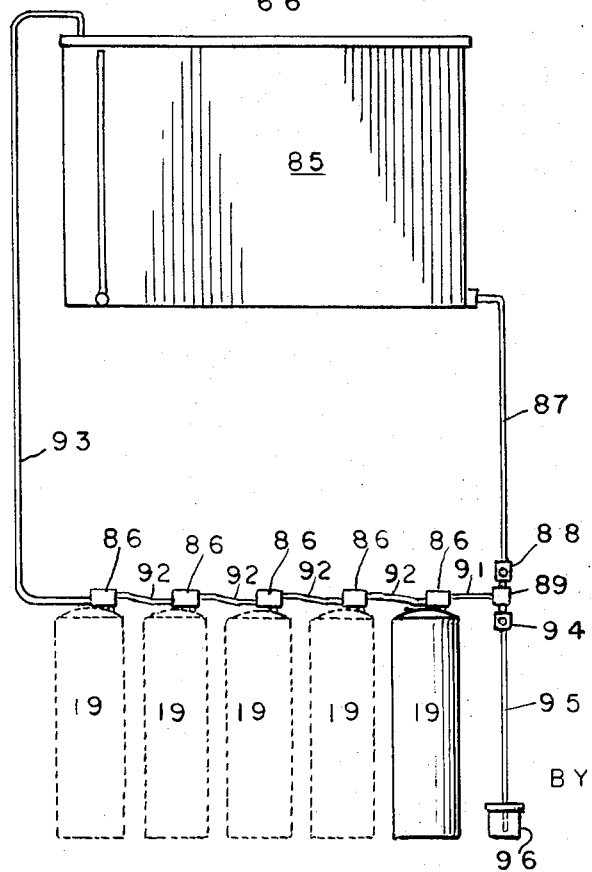
FIG. 3 is a diagrammatic view of the refill system for the chemical treating solution tanks to refill each tank and provide a suitable air head therein.

The feeding of the hypochlorite solution continues on the basis provided by the calender timer 22 until the tank is empty of the treating solution. Then, this tank is exchanged for a filled tank and the exhausted tank is returned to a plant for refilling. FIG. 3 discloses the arrangement utilized for refilling a plurality of tanks 19. This refilling operation has an overhead reservoir 85 for gravity feed of the prepared treating solution to the tanks. Each tank has a refill valve 86 which is threaded into the adapter 64 at the top of the tank 19 and the fitting 61 on each tank is vented to waste or drain.

As shown, the reservoir 85 has a vertical feed conduit 87 from the bottom of the reservoir 85 to a first valve 88. Below the valve is a T-connection 89 with a lateral conduit 91 leading to the refill valve on the first tank. Additional conduits 92 connect additional tanks 19 in series, and a standpipe 93 leads from the valve 86 of the last tank back to the reservoir. Below the T-connection 89 is a second valve 94 with a siphon tube 95 depending therefrom and draining into an over-fill container 96. The function of this system will be described later.

The refill valve 86 as clearly shown in FIG. 4 has an externally threaded flanged fitting 97 which threadingly engages the adapter 64 and clamps the enlarged base 98 of a tubular member 99 in the adapter. The tubular member extends upwardly beyond the fitting 97 and threadingly engages the valve body 101. The valve body has a central passage 102 which communicates with the central passage in the tubular member 99 and is provided with oppositely disposed upper and lower lateral passages 103 and 104, respectively. Lateral passage 103 has a fitting 105 for a conduit 91 or 92 and lower lateral passage 104 has a fitting 106 for a conduit 92 or standpipe 93.

A central tube or conduit 107 has one end 108 secured in the central passage 102 below the upper lateral passage 103 and depends therefrom through and extends below the tubular member 99 so that the lower end 109 extends into the tank 19. The central passage from lateral passage 103 communicates solely with the passage 111 through the tube 107, and an annular passage 112 is formed between the inner wall of the tubular member 99 and the outer wall of the tube 107 and communicates with the lower lateral passage 104.

To refill the solution tanks with hypochlorite solution, the tanks are arranged as shown in FIG. 3 with the lateral line 91 connected to the fitting 105 of the valve 86 on the first tank 19 and a conduit 92 extending from fitting 106 of the valve 86 to the fitting 105 of valve 86 on a second tank 19. The remaining tanks are connected in series with the standpipe 93 connected to the fitting 106 of the last valve. The reservoir 85 is filled with the hypochlorite solution and the fittings 61 on the tanks 19 are directed to waste.

The first valve 88 is opened with the second valve 94 remaining closed, and the solution flows by gravity through feed conduit 87, first valve 88, T-connection 89, inlet fitting 105, passages 103, 102 and 111 into the liner 54 in the tank 19. As the liner is filled with solution and expands, the water between the tank wall 52 and the liner 54 is expelled through the fitting 61 to waste. Any air which is trapped in the liner passes through the annular passage 112 to the next tank. It is essential that the air be removed from the interior of the liner because the presence of air will cause a buoyant force of the liner bag top against the interior of the top of the tank to block the water exit hole for fitting 61 and thus prevent further filling of the bag. When the liner bag is fully expanded, the solution entering through the tube 107 flows to the next tank through annular passage 112, passage 102, lower lateral passage 104, fitting 106 and line 92 to the fitting 105 of the next valve. This process is continued until all the liner bags are fully expanded and the hypochlorite solution will then rise in the standpipe 93 until the liquid height in the standpipe equals the solution level in reservoir 85.

Although the tanks 19 are now completely filled, a second essential of the refill device is that an air head be established in the liner as the filled tanks must be vented and the air head prevents oozing of the hypochlorite solution. To do this, with the tank remaining as shown in FIG. 3, the water holes of the fittings 61 are plugged, the first valve 88 is closed and the second valve 94 is opened. The solution in the standpipe 93 exerts sufficient pressure to start a reverse flow with solution passing backward through the T-connection 89 and valve 94 into the siphon tube 95, to establish the reverse siphon. Excess solution is passed through the siphon tube 95 to the over-fill container 96. The hypochlorite solution enters the last tank through the annular passage 112 in the valve 86 and as the siphon continues the solution is drawn from the liner through the tube 107 until the solution level in the tank reaches the lower end 109 of the tube 107 where air breaks the siphon in the last tank. The siphon action continues in the rest of the tanks until air breaks the siphon in each one in reverse order and no more solution emerges from the siphon tube 95 and the second valve 94 is closed. The tanks are now ready to have the valves 86 removed and be returned to service in the pool water treatment system in FIG. 1.

Although a gravity feed system for the tanks 19 is shown in FIG. 3, the present invention also contemplates the filling of the tanks 19 by pumping the sodium hypochlorite from the reservoir 85 with a conventional mechanical pump. In this arrangement, the standpipe 93 would not be required, but a connection from the last tank to the reservoir would be needed for overflow. Also, the process of initiating reverse siphoning would be altered where a pump is utilized.

Having thus disclosed my invention, I claim:

1. A pool water treatment system for treating swimming pool water comprising a circulating pump drawing water from a swimming pool, a filter for receiving and filtering the water discharged from said pump, a return conduit from the filter to the pool, a storage tank for a treating solution having an inlet and an outlet, a flexible liner sealed within said tank adjacent said outlet and containing the treating solution therein, the interior of the liner communicating with said outlet, said inlet communicating with the space formed between the tank wall and the liner, a time-flow valve including a solenoid-actuated valve having an inlet communicating with the circulating water flow between the pump and the filter and an outlet communicating with the inlet on the storage tank, and a timer actuating said solenoid valve to allow water flow through the solenoid valve at timed intervals and an anti-siphon valve connected to the outlet of the storage tank and having an inlet communicating with the tank outlet and an outlet communicating with said circulating water flow downstream of the filter, said anti-siphon valve allowing passage of treating solution from the liner by water pressurizing the tank through the tank inlet but preventing removal of treating solution from the tank by suction at the outlet of the anti-siphon valve; the water entering the tank inlet upon actuation of the solenoid valve positively displacing an equivalent amount of treating solution to the circulating water flow.

2. A pool water treatment system as set forth in claim 1, in which said anti-siphon valve includes an annular valve seat, and a flexible plate cooperating with the valve seat to interrupt flow of solution between the valve inlet and valve outlet.

3. A pool water treatment system as set forth in claim 2, in which said anti-siphon valve includes a valve body, said body having an offset passage from the valve inlet and communicating with an annular recess surrounding said valve seat, said valve also having a central passage extending between the valve seat and the valve outlet, said flexible plate covering said annular recess and said central passage and normally engaging said valve seat.

4. A pool water treatment system as set forth in claim 3, in which the area of said annular recess is substantially greater than the area of said central passage defined by the valve seat, and a spring above and abutting the flexible disk to bias the disk against said valve seat.

5. A pool water treatment system as set forth in claim 4, in which said passages and annular recess open at the upper end of the valve body, and a cap threadingly secured to the valve body and clamping the periphery of the flexible disk therebetween, said spring having one end abutting the cap and the opposite end abutting the disk.

6. A pool water treatment system as set forth in claim 4, in which said flexible disk seats on said annular valve seat to prevent the siphoning of solution from said tank, and the force of said spring acting on said disk prevents reverse flow through the valve at normal pumping pressure.

References Cited

UNITED STATES PATENTS

| 2,012,406 | 8/1935 | Savell. | |
| 2,529,028 | 11/1950 | Landon. | |
| 2,573,299 | 10/1951 | Bast | 137—564.5 |
| 2,618,510 | 11/1952 | Mills | 137—564.5 |
| 2,659,516 | 11/1953 | Smith | 222—70 |
| 2,808,934 | 10/1957 | Rivas | 210—169 X |
| 2,865,388 | 12/1958 | Sternbergh | 137—564.5 |
| 3,073,330 | 1/1963 | Fattor | 137—624.15 X |
| 3,166,096 | 1/1965 | Lang | 222—386.5 X |
| 3,223,242 | 12/1965 | Murray | 210—169 X |

REUBEN FRIEDMAN, *Primary Examiner.*

D. M. RIESS, *Assistant Examiner.*